Figure 1:
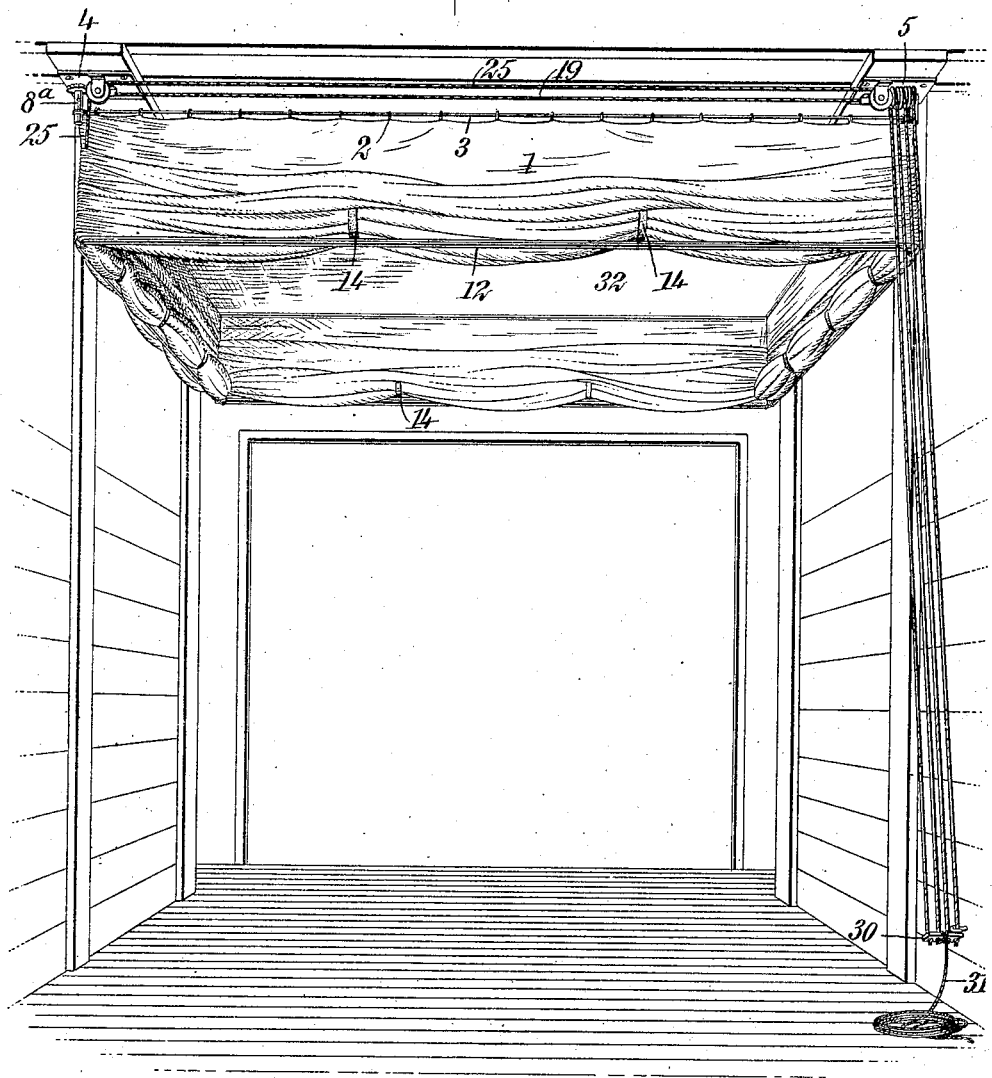

No. 844,220. PATENTED FEB. 12, 1907.
E. L. WESTBROOKE.
VEHICLE COVER.
APPLICATION FILED SEPT. 15, 1906.

4 SHEETS—SHEET 1.

WITNESSES

INVENTOR
Edward L. Westbrooke
BY Munn & Co
ATTORNEYS

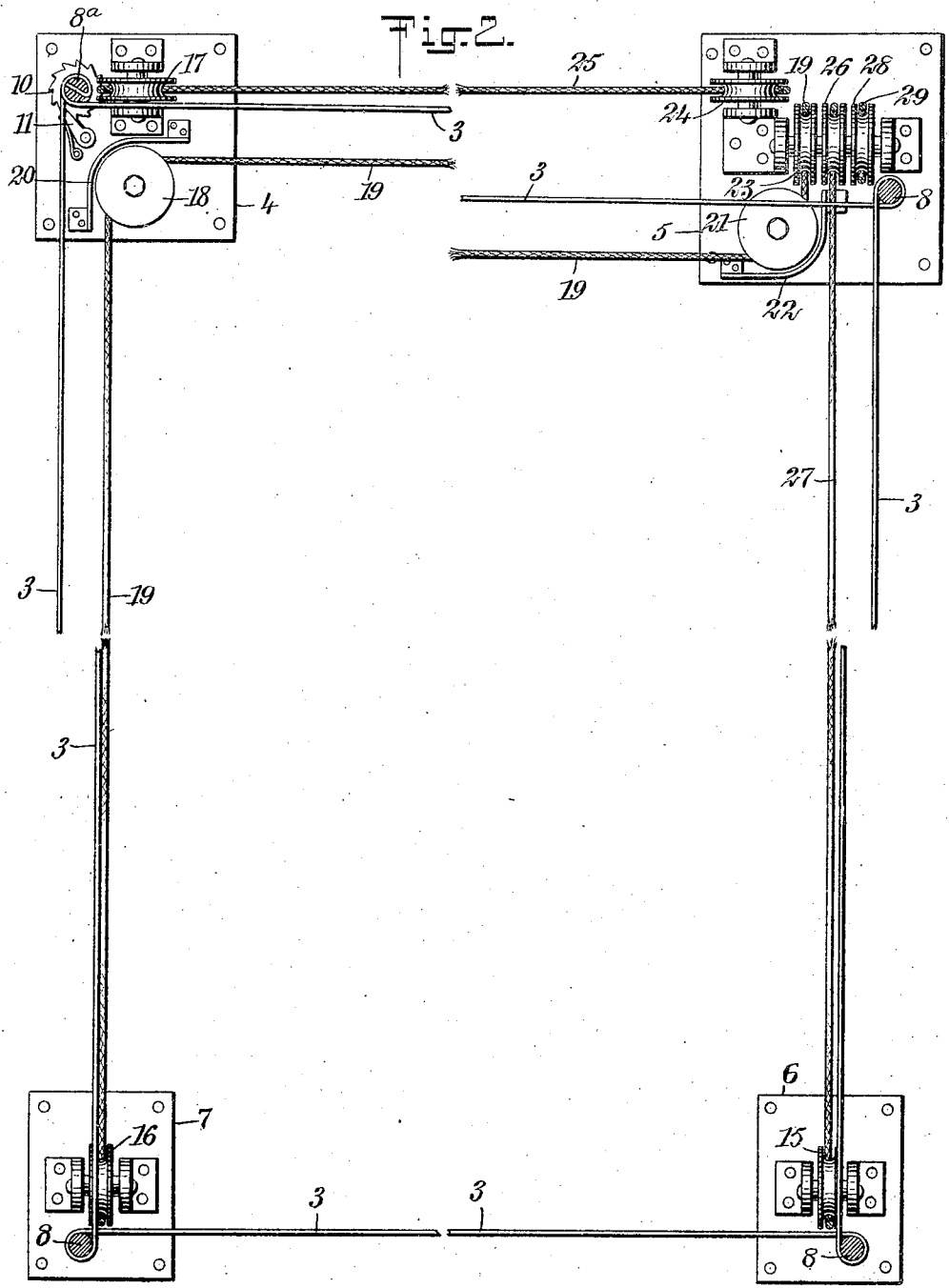

No. 844,220.
PATENTED FEB. 12, 1907.
E. L. WESTBROOKE.
VEHICLE COVER.
APPLICATION FILED SEPT. 15, 1906.
4 SHEETS—SHEET 3.
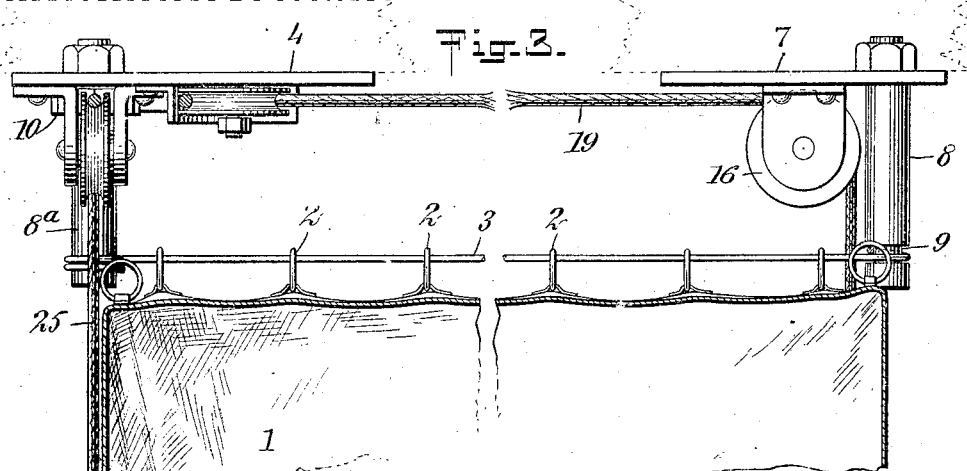
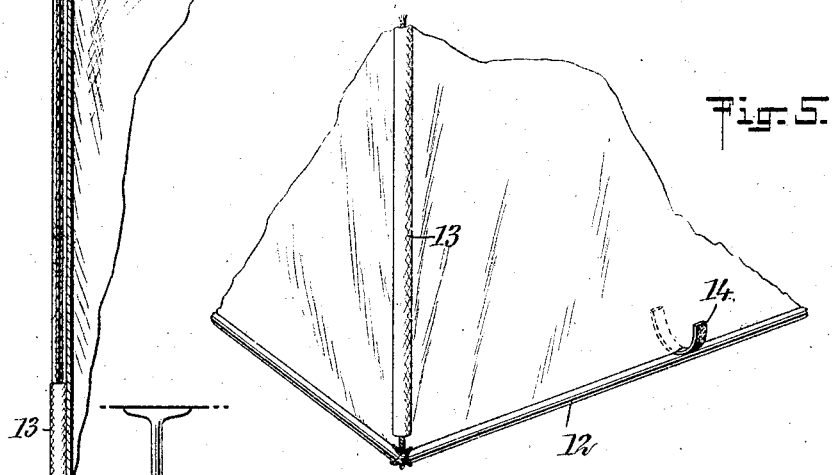
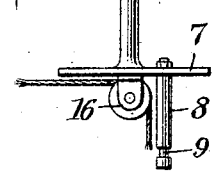
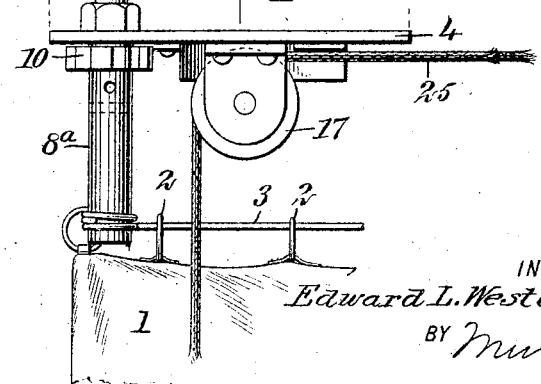
WITNESSES
INVENTOR
Edward L. Westbrooke
BY Munn & Co
ATTORNEYS

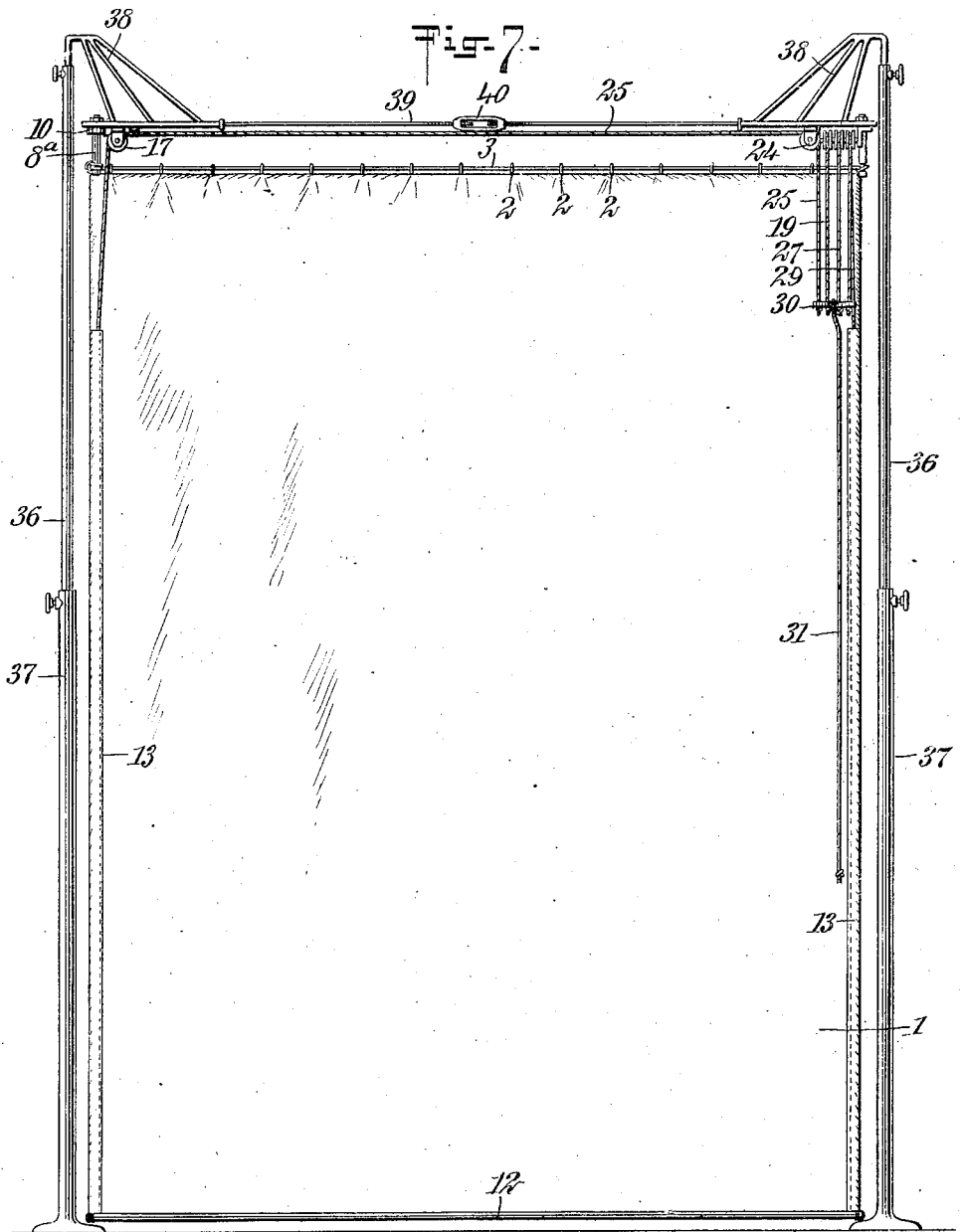

UNITED STATES PATENT OFFICE.

EDWARD LYNN WESTBROOKE, OF JONESBORO, ARKANSAS.

VEHICLE-COVER.

No. 844,220.  Specification of Letters Patent.  Patented Feb. 12, 1907.

Application filed September 15, 1906. Serial No. 334,728.

*To all whom it may concern:*

Be it known that I, EDWARD L. WESTBROOKE, a citizen of the United States, and a resident of Jonesboro, in the county of Craighead and State of Arkansas, have invented a new and Improved Vehicle-Cover, of which the following is a full, clear, and exact description.

This invention relates to a dustproof protector for vehicles of all kinds to be used when the vehicle is standing still, and is particularly desirable as a protector from dust for automobile carriages, surreys, and the like.

The object of the invention is to produce a cover properly supported and suspended from above the vehicle and capable of being dropped down around it and protect it from dust and at the same time is light enough to be readily drawn up from the vehicle when it is desired to use the latter.

The device is preferably constructed of a heavy dustproof cloth held in place by suitable mechanism, hereinafter described, and capable of being easily raised and lowered.

Reference is to be had to the accompanying drawings, forming a part of this specification, in which similar characters of reference indicate corresponding parts in all the figures, in which—

Figure 1 is a perspective view of my improved vehicle-cover in its raised position. Fig. 2 is an inverted plan view of the mechanism employed to support and operate the walls of the cover. Fig. 3 is a side elevation of a portion of the supporting means. Fig. 4 is a detail showing the means for tightening the supporting-wire. Fig. 5 is a detail of a lower corner of the cover. Fig. 6 shows a modified form of the support for the entire device, and Fig. 7 shows a second modified form of the supporting means.

My improved vehicle-cover comprises four side walls or curtains 1 of dust-proof fabric, secured together along their vertical edges and forming an inclosure large enough to receive any desired vehicle. The upper edge of each curtain or side wall is provided with a plurality of rings or eyes 2, by which the curtain is supported upon a tight wire 3 stretched on the overhead support.

In the preferred form of construction—namely, that illustrated in Figs. 1, 2, and 3—I provide four plates 4, 5, 6, and 7, secured to the ceiling of a room and located at points about the four corners of the inclosed space formed by the curtains. Each of the corner-plates is secured in place in any suitable manner and provided with a post extending downwardly from the plates any suitable distance. Three of these posts 8 are provided with an annular recess 9, adjacent their lower ends, while the fourth one, $8^a$—namely, the post suspended from the plate 4—is provided with perforations, through which extend the ends of the supporting-wire 3. This wire extends from the post $8^a$ to the post on the next adjacent plate, and after encircling the post at the annular recess 9 it extends to the second post, and so on around to the post on the plate 4, where it again passes through an opening. The wire stretching from post to post forms a rectangle the size and shape of which determines the size of the inclosure below, inasmuch as the curtain is suspended from this wire. To prevent the wire from sagging and to maintain it taut at all times, I provide a ratchet 10 on the post $8^a$, which ratchet is prevented from rotating on one direction by a spring-pressed pawl 11. By turning the post $8^a$ by means of a key or in any other suitable manner the wire may be wound around the post $8^a$ and as it is free to move around the post 8 may be tightened throughout its entire length by the use of a single ratchet.

The lower end of the curtain is securely fastened to a rectangular frame 12, preferably formed of metal tubing, which frame serves as a weight to hold the lower end of the curtain down and at the same time hold it to its rectangular shape. The curtain at each corner is preferably provided with a sleeve 13, inclosing a cord extending from the corner of the frame 12 to suitable pulleys on the overhead support, the sleeves serving to maintain the curtain in position as it is being raised by said cords. The metal frame 12 is preferably provided with upwardly-extending arms forming a U-shaped receiver 14, which gathers in the folds of the curtain and supports the same when it is in its raised position. (Clearly indicated in Fig. 1.) This receiver may, if desired, be covered with fabric or other material, whereby it is prevented from scratching the sides of a vehicle, should the latter not be centrally located within the cover.

For raising and lowering the curtain I provide suitable pulleys on the overhead plates 4, 5, 6, and 7, over which the cords from the corners of the curtain are extended, and in order that all sides of the curtain may be raised simultaneously and by a single operation I preferably provide two of the corner-plates—namely, 6 and 7—with single pulleys 15 and 16, having their axes mounted in a horizontal plane and in any suitable form of journals. The corner-plate 4 is provided, not only with a pulley 17, similar to the pulleys 15 and 16, but is also provided with a second pulley 18, mounted with its axis in a vertical line and adapted to receive the rope 19, which passes over the pulley 16 and to the lower corner of the curtain. This pulley 18 is preferably mounted closely adjacent to the plate 4 and is provided with a curved protecting-shield 20, closely following the outer surface of the pulley through a portion of its circumference and designed to prevent the accidental displacement of the cord 19 from the pulley.

The plate 5 is provided with five pulleys, one of which, 21, is similar in all respects to the pulley 18, save that its protecting-shield 22 is mounted on the opposite side, whereby the cord 19 coming from the pulley 16 and around the pulley 18 may pass on the opposite side of the pulley 19 and to one of a set of four pulleys mounted on horizontal axes and over which pass the four cords from the four corners of the curtain. One of these pulleys 23 receives the cord 19 from the opposite plate 7 after each cord has passed around the pulleys 18 and 21, while a second pulley 24 receives the cord 25 coming from the adjacent corner-plate 4 after the cord has passed over the pulley 17, a third pulley 26 receives the cord 27 from the other adjacent corner-plate 6 after the cord has passed over the pulley 15, and the fourth pulley 28 receives the cord 29, secured to the curtain directly below said pulley. The four cords 19, 25, 2, and 29 are attached together or to a suitable plate 30 at a point closely adjacent the plate 5 when the curtain is in its lowest position, and from this plate 30 extends a cord 31, by which all four of the cords may be pulled simultaneously and all four of the corners raised at the same time. As the corners of the curtain are raised the sleeves 13 on the curtain are gathered in folds on the corner-rods and the intermediate folds of the curtain are held within the U-shaped receivers 14. Thus all four walls of the cover are raised evenly and uniformly and prevented from sagging or falling below the bottom frame 12.

The bearings of the pulleys are made as easy running as possible, and as the curtain itself weighs but little very little strength is required to raise the entire device by pulling on the cord 31.

The four walls are connected at their upper ends by a horizontal wall or cover 32, so that when the cover is dropped into position it completely and perfectly incloses the vehicle, and it is impossible for any dust or dirt to settle thereon, which dust and dirt, as is well known, is very injurious to the highly-polished surfaces of vehicles.

In the form disclosed in Figs. 1, 2, and 3 the improved vehicle-cover is designed to be supported from the ceiling or other suitable structure within a garage or other building, but it is evident that the corner-plates may be supported in any suitable manner. In Fig. 6 I have shown a detail of one corner in which the plate 7 is secured to the ceiling or other overhead support by two telescoping tubes 33 and 34, held in any desired position by a set-screw 35. It is evident that by the employment of such supporting means for the corner-plates that may be held at any desired distance beneath the ceiling of a room, thus avoiding the necessity of having a curtain of much greater height than that of the vehicle.

For supporting my improved vehicle-cover from the ground or in the center of a large room or building having a high ceiling I may, if desired, provide extensible supports made up of telescoping tubes 36 and 37, adapted to be secured to the ground in any suitable manner and having branch supports 38 at the upper end thereof adapted to be secured to the corner-plates. When this form of support is employed, I preferably hold the corner-plates apart at their upper ends by suitable rods 39, having turnbuckles 40 intermediate their length, whereby the corner-plates may be held at any desired distance apart and the curtain-supporting wires 3 drawn as taut as desired without relaxing the upper end of the structure. This form of support is especially desirable for use by persons touring the country, as it may be folded up into very small compass and carried on the vehicle. At night it would take but a few minutes to erect the protection and would then serve to keep off the dew as well as the dust, and might even be employed to protect the occupants of a vehicle during a storm.

The entire device is very light, strong, and durable and when in use is supported at such a distance above the floor of a building that it is entirely out of the way and does not interfere with the free use of the building. When it is desired to cover a vehicle, all that is necessary is to run the vehicle beneath the cover and by unfastening the rope 31 from any suitable cleat or catch on the wall the walls of the cover drop down around the vehicle to perfectly exclude dust and moisture.

Having thus described my invention, I claim as new and desire to secure by Letters Patent—

1. A vehicle-cover comprising a rectangular body portion formed of dust-proof fabric, means for supporting the upper edges of said body portion at a definite distance above the floor, and means for simultaneously raising all the lower sides to points adjacent the upper sides, said means comprising a pulley supported above each upper corner of the body portion, and cords connected to each lower corner of the body portion and extending over said pulleys.

2. A vehicle-cover, comprising four downwardly-extending posts, a supporting-wire connecting said posts, means for tightening the said wire, curtains or side walls suspended from said wire, and means for simultaneously raising the lower edges of said side walls, said means comprising a pulley supported above each upper corner of the body portion, and cords connected to each lower corner of the body portion and extending over said pulleys.

3. A vehicle-cover, comprising four corner-plates, suitable pulleys mounted on the under sides thereof, downwardly-extending posts carried by said plates, a supporting-wire connecting the posts, means for tightening said wire, curtains or side walls suspended from said wire, and means for simultaneously raising the lower edges of said side walls, said raising means comprising cords secured to the four corners and extending over the said pulleys.

4. A vehicle-cover, comprising suitable overhead supports, downwardly-extending posts carried thereby, side walls of suitable fabric, a wire connecting said posts and adapted to support the upper edges of said side walls, a rectangular frame carried by said side walls at the lower edges thereof, pulleys carried by said overhead supports, and cords extending from the corners of said frame and over said pulleys, whereby all of said side walls may be simultaneously raised.

5. A vehicle-cover, comprising four side walls of suitable fabric, stationary means for supporting the upper edges of said side walls, a rectangular frame carried by the lower edges thereof, a plurality of U-shaped receivers supported on said frame, and means connected to the corners of said frame for raising the latter, whereby the folds of the side walls are received within the U-shaped receivers.

6. A vehicle-cover, comprising suitable overhead supports, means for adjusting the height of said supports, downwardly-extending posts carried by said supports, a supporting-wire connecting said posts, means whereby the wire may be drawn taut, side walls or curtains suspended from said wire, and means independent of said wire for simultaneously raising or lowering all of said side walls.

7. A vehicle-cover comprising four corner-plates, independent means for supporting said plates, a downwardly-extending post carried by each of said plates, a wire connecting the lower ends of said posts, means for tightening said wire, a pulley mounted on the under side of each of said plates, a rectangular frame, cords connecting the respective corners of said frames with said pulleys, and fabric side walls suspended from said wire and having their lower edges secured to said frame.

8. A vehicle-cover comprising suitable overhead supports, downwardly-extending posts carried by said supports, a supporting-wire connecting said posts, means whereby the wire may be drawn taut, side walls or curtains suspended from said wire, a rectangular frame secured to the lower edges of said side walls, means independent of said wire for raising said frame, and U-shaped receivers secured to said frame.

In testimony whereof I have signed my name to this specification in the presence of two subscribing witnesses.

EDWARD LYNN WESTBROOKE.

Witnesses:
E. C. STUCK,
J. H. MANGRUM.